United States Patent
Agarwal et al.

(10) Patent No.: US 7,925,211 B2
(45) Date of Patent: *Apr. 12, 2011

(54) METHOD FOR UPLINK POWER CONTROL FOR DISTRIBUTED SATELLITE NETWORKS TO COMPENSATE FOR RAIN FADE

(75) Inventors: Anil K. Agarwal, Gaithersburg, MD (US); Moorthy N. Hariharan, Germantown, MD (US)

(73) Assignee: Viasat, Inc., Carlbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/429,071

(22) Filed: Apr. 23, 2009

(65) Prior Publication Data

US 2009/0221317 A1    Sep. 3, 2009

Related U.S. Application Data

(63) Continuation of application No. 09/529,773, filed as application No. PCT/US98/21632 on Oct. 20, 1998, now Pat. No. 7,599,658.

(60) Provisional application No. 60/064,673, filed on Oct. 20, 1997, provisional application No. 60/062,496, filed on Oct. 20, 1997, provisional application No. 60/062,497, filed on Oct. 20, 1997.

(51) Int. Cl.
*H04B 7/185*    (2006.01)

(52) U.S. Cl. .................................. 455/13.4; 370/318
(58) Field of Classification Search ........ 455/12.1–13.4, 455/427–430, 522; 370/316, 318
See application file for complete search history.

(56) References Cited

U.S. PATENT DOCUMENTS

| | | | |
|---|---|---|---|
| 4,999,583 A | | 3/1991 | Washburn et al. |
| 5,864,547 A | * | 1/1999 | Strodtbeck et al. ........... 370/318 |
| 5,991,280 A | * | 11/1999 | Ichiyoshi ...................... 370/321 |
| 5,999,832 A | * | 12/1999 | Vannatta et al. ........... 455/575.1 |
| 6,212,360 B1 | * | 4/2001 | Fleming et al. .............. 455/13.4 |

* cited by examiner

*Primary Examiner* — Raymond S Dean
(74) *Attorney, Agent, or Firm* — Sughrue Mion, PLLC (57) ABSTRACT

A method for dynamically determining the power compression point of an amplifier in a distributed network under the control of a computer, the network having a first terminal (600) including the amplifier operatively coupled to a plurality of second terminals (500) by a communication channel including the steps for generating bit error rate (BER) messages indicative of measured BER for a signal transmitted at N power levels, the BER messages including respective tags indicative of the N power levels for that BER, at the second terminals (500), and reducing the maximum allowed power of the amplifier when it is determined that the amplifier is approaching saturation responsive to the BER messages. Also described is a method for dynamic uplink power control for an amplifier in a distributed network.

20 Claims, 4 Drawing Sheets

METHOD FOR UPLINK POWER CONTROL FOR DISTRIBUTED SATELLITE NETWORKS TO COMPENSATE FOR RAIN FADE

This is a continuation of application Ser. No. 09/529,773 filed Jun. 30, 2000 now U.S. Pat. No. 7,599,658, which is a National Stage Application filed under §371 of PCT Application No. PCT/US98/21632 filed Oct. 20, 1998, which claims benefit of Provisional Application Nos. 60/064,673, 60/062,496, and 60/062,497, all filed on Oct. 20, 1997. The entire disclosure of the prior application Ser. Nos. 09/529,773 is hereby incorporated by reference.

This application is based on and claims priority from provisional patent applications, Ser. Nos. 60/064,673, 60/062, 497 and 60/062,496, which are incorporated herein by reference for all purposes.

BACKGROUND OF THE INVENTION

The present invention relates generally to methods for uplink power control for satellite/wireless networks. More specifically, the present invention relates to methods for uplink power control for distributed satellite/wireless networks which compensate for rain fade and other equipment impairments. In addition, the present invention relates to methods for dynamically determining the power compression point for distributed satellite/wireless networks.

Wireless and Satellite networks have evolved over the years. Network architectures have evolved from star topologies supporting fixed private line voice and data to full-mesh systems for emerging ATM, Frame Relay, and ISDN traffic. Therefore, the network nodes have varying uplink capabilities that are optimized for cost and performance. Networks have also evolved in complexity. Older networks traditionally used static bandwidth management schemes. Today's networks allocate bandwidth on demand, i.e., bandwidth is continuously changing while the network is carrying traffic. To minimize cost, the earth station transmit amplifiers are selected to deliver the rated power close to saturation, without an overly conservative built-in margin. However, the output of most of the commercially available amplifiers tends to degrade in terms of spectral side-lobe and shoulder regrowth when operated close to or in saturation. Therefore, the solutions developed should work in a power limited Bandwidth-On-Demand environment and meet stringent specifications for spectral regrowth.

Several approaches to material issues have been developed over the years. Two of the more popular algorithms that have been used for UPC are in star topology Very Small Aperture Terminal (VSAT) systems and Mobile Cellular systems. Traditional VSAT systems employ open-loop methods for UPC. Link quality measurements are performed on the same local downlink associated with the transmitter, using actual carrier signals or satellite beacons. An estimate of the uplink fade is derived from these downlink measurements and the transmit power is adjusted. In contrast, terrestrial cellular systems typically measure link quality of the mobile transmitter in a base station and feedback corrections to achieve a target link quality.

Both these methods operate on a single point-to-point transmit-receive pair basis. Very often, current methods require a wide power control dynamic range, and may drive the transmitter to operate in saturation, especially with changes over time and temperature.

Moreover, U.S. Pat. No. 5,619,525 to Wiedeman et al., for example, discloses a method of operating a satellite communication system, which method provides adaptive closed loop power control. First, the ground station transmits an uplink reference signal with a first frequency to the satellite. The uplink reference signal experiences an attenuation between the ground station and the satellite due to, for example, a rain cell. The satellite then receives the reference signal and repeats the reference signal at a second frequency as a downlink reference signal that is transmitted from the satellite. The second frequency is less than the first frequency and is not significantly impaired or attenuated by the rain cell. The downlink reference signal is transmitted with a power that is a function of the power of the received uplink reference signal. Then, the downlink reference signal is received and used to determine the amount of attenuation that was experienced at least by the uplink reference signal between the ground station and the satellite. Thereafter, the transmitted power of the uplink reference signal is adjusted in accordance with the determined amount of attenuation so as to substantially compensate for the experienced attenuation. It would be preferable to avoid such complexities.

Thus, the problem of UPC has been addressed extensively for traditional fixed star/mesh topology networks. However, existing solutions do not meet the needs of a Bandwidth-On-Demand satellite network with diverse earth station configurations. Currently used methods do not ensure link quality between every dynamically varying transmit/receive pair on a burst-basis. Some of the current approaches may drive transmit amplifiers into an operating region that increases spectral sidelobe/shoulder regrowth. Such methods usually allocate a huge link margin that increases the transmit amplifier power requirement and hence drives up the cost. Operating transmitters with a large built-in margin consumes excess satellite transponder power and decreases available transponder bandwidth capacity.

What is need is an UPC method which correctly discriminates between rain or impairments on the uplink or downlink when overall link quality degrades. Moreover, what is needed is a method for power control which is capable of adapting to the varying traffic in Bandwidth-On-Demand networks wherein the bandwidth to different destinations from each node is continuously changing. In short, what is needed is an UPC method for compensating for uplink fade and degradations, when needed, in a mesh network of various earth stations.

SUMMARY OF THE INVENTION

Based on the above and foregoing, it can be appreciated that there presently exists a need in the art for a uplink power control method which overcomes the above-described deficiencies. The present invention was motivated by a desire to overcome the drawbacks and shortcomings of the presently available technology, and thereby fulfill this need in the art.

The present invention is a novel method for performing Uplink Power Control (UPC) in burst mode satellite/wireless networks. The UPC process relies on measurement of transmitter (uplink) link quality at multiple receiver (downlink) nodes in a distributed network. The link quality measurements are transferred to a central Network Control Center (NCC) computer, which computer implements a novel method for iteratively adjusting the transmit power on a per-burst basis to thereby achieve improved target link quality. This method features optimal response loop time constants to compensate for fast weather induced uplink fades as well as slow degradations in transmit amplifier power due to temperature variations and aging. A special method is used to detect the transmit power amplifier compression point dynamically and ensure sufficient input-back-off (IBO) under all conditions.

One object of the present invention is to provide a method for uplink power control which compensates for uplink rain fade and equipment impairments.

Another object according to the present invention is to produce a method for uplink power control which operates accurately in a network of different earth station configurations in terms of location, transmit power, amplifier type, and antenna size.

Still another object according to the present invention is provide a method for uplink power control which operates accurately in a full mesh distributed TDMA network with low overhead.

Yet another object according to the present invention is to provide a method for uplink power control which automatically factors out the effects of downlink impairments including rain fade at receiver nodes on the network.

Another object according to the present invention is to provide a method for uplink power control which compensates for shifts in transmit amplifier AM-AM characteristics with time and temperature.

An object according to the present invention is to provide a method for uplink power control which is suitable for use in Bandwidth-On-Demand networks where traffic bursts are allocated and de-allocated based on user traffic/call requirements.

Another object according to the present invention is to provide a method for uplink power control which conserves overall transmit power of all terminals.

Still another object according to the present invention is to produce a method for uplink power control which conserves satellite transponder power and bandwidth.

These and other objects, features and advantages according to the present invention are provided by a method for dynamically determining the power compression point of an amplifier in a distributed network under the control of a computer, the network having a first terminal including the amplifier operatively coupled to a plurality of second terminals by a communication channel. Advantageously, the method includes steps for generating bit error rate (BER) messages indicative of measured BER for a signal transmitted at N power levels, the BER messages including respective tags indicative of the N power levels for that BER, at the second terminals, and reducing the maximum allowed power of the amplifier when it is determined that the amplifier is approaching saturation responsive to the BER messages.

These and other objects, features and advantages according to the present invention are provided by a method for dynamically determining the power compression point of an amplifier in a distributed network under the control of a computer, the network having a first terminal including the amplifier operatively coupled to a plurality of second terminals by a communication channel. Preferably, the method includes steps for transmitting a signal at N power levels to the second terminals, where N is a positive integer, measuring a bit error rate (BER) for each of the N power levels at the second terminals, generating BER messages including respective tags indicative of the N power levels for that BER, transmitting the BER messages to the computer and, when it is determined that the amplifier is approaching saturation from the BER messages, reducing the maximum allowed power of the amplifier.

These and other objects, features and advantages according to the present invention are provided by a method for dynamic uplink power control for an amplifier in a distributed network under the control of a computer, the network having a first terminal including the amplifier operatively coupled to a plurality of second terminals by a communication channel. The method includes steps for examining a plurality of control burst bit error rate (CB BER) measurement reports, computing an average CB BER responsive to the CB BER measurement reports, when the average BER is greater than the predetermined BER threshold, increasing power level of the amplifier, and when the average BER is less than the predetermined BER threshold, decreasing power level of the amplifier.

These and other objects, features and advantages according to the present invention are provided by a method for dynamic uplink power control for an amplifier in a distributed network under the control of a computer, the network having a first terminal including the amplifier operatively coupled to a plurality of second terminals by a communication channel. Preferably, the method includes steps for examining a plurality of control burst bit error rate (CB BER) measurement reports, computing an average CB BER responsive to the CB BER measurement reports, comparing the average BER with a predetermined BER threshold, when the average BER is greater than the predetermined BER threshold, increasing power level of the amplifier, and when the average BER is less than the predetermined BER threshold, decreasing power level of the amplifier.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

As previously mentioned, the methods for performing Uplink Power Control (UPC) in burst mode satellite/wireless networks rely on measurement of transmitter (uplink) link quality at multiple receiver (downlink) nodes in the distributed network. The link quality measurements are transferred to a central Network Control Center (NCC) computer, which computer implements a novel method for iteratively adjusting the transmit power on a per-burst basis to thereby achieve improved target link quality. This method features optimal response loop time constants to compensate for fast weather induced uplink fades as well as slow degradations in transmit amplifier power due to temperature variations and aging. Moreover, the NCC computer employs an additional method to dynamically detect the transmit power amplifier compression point and ensure sufficient input-back-off (IBO) under all conditions.

Figure 1:
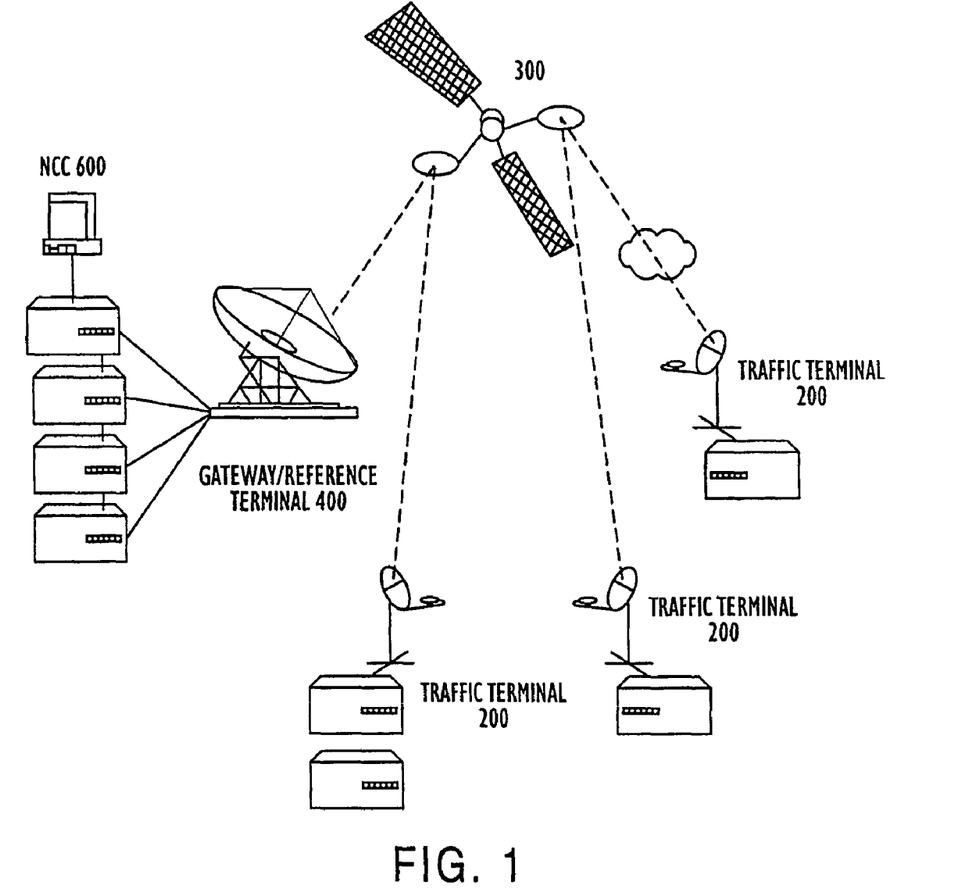
FIG. 1 is a partially block, partially schematic illustration of a network to which the methods according to the present invention are applied.

FIG. 1 illustrates a model of the network architecture employing the novel methods according to the present invention. A network consists of a set of terminals, including a plurality of traffic terminals 200 connected to a master reference terminal 400, which is under control of a network control center (NCC) 600, via a satellite 300. It will be appreciated that the network depicted in FIG. 1 is only one of a myriad of possible network configurations and that all such network configurations are considered be included with the scope of the present invention. The methods implemented via NCC 600 work in a distributed environment; multiple terminals 200 act as measuring stations and the NCC 600 implements the primary UPC method based on feedback reports from the various terminals 200.

It should be mentioned that the network depicted in FIG. 1 employs the Time Division Multiple Access (TDMA) technique to access satellite capacity, i.e., time is divided using a framing structure. A frame is a fixed period of time, with some way to identify the start and end of that time period. A frame contains bursts. Such a framing structure is commonly used in TDMA satellite networks. In satellite networks, frames are usually of the order of milliseconds. It will be appreciated that terrestrial networks also have framing structures, e.g., for T1 or E1 framing, etc.

Figure 2:
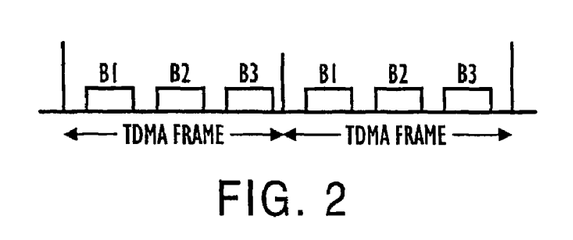
FIG. 2 illustrates the TDMA frame structure for three bursts.

FIG. 2 illustrates the TDMA frame structure with three bursts B1, B2 and B3. It will be appreciated that TDMA operates according to the following general rules:

1. Data is transmitted on the channels, which are contained in bursts.
2. Each burst is defined at a fixed offset (henceforth referred to as a burst offset) relative to a start of frame (SOF) instant.
3. The network uses a pool of radio frequency (RF) carriers at different frequencies.
4. A burst is allocated on a carrier.
5. Bursts on the same carrier cannot overlap in time. Bursts on different carriers may, however, overlap in time.
6. Carriers are subdivided into slots. No two bursts can begin in the same slot in one carrier (burst offsets should fall in different slots).
7. Bursts are allocated among modems, wherein the term "modem" or "terminal" is henceforth used to denote the earth station which transmits or receives a burst.

It should also be mentioned that in the network illustrated in FIG. 1, it is assumed that the terminal that transmits, e.g., MRT 400, a burst knows the offset of the burst relative to the start of frame, the carrier frequency, and the power level. On the receive side, the terminal, e.g., TT 200, tunes to the corresponding carrier frequency and extracts the burst knowing the approximate position in time. Every terminal has a reliable control channel to and from the NCC 600, implemented using data channels within special bursts. Thus, the NCC 600 and terminals 200, 400 can exchange messages.

Moreover, bursts are addressed to and from terminals. A burst can be modulated using Quadrature Phase Shift Keying (QPSK) or Binary Phase Shift Keying (BPSK) techniques. BPSK gives a 3 dB improvement in performance over QPSK, but uses twice the number of symbols in a TDMA frame for the same information content. In a typical a network, the modulator output level can be varied between −15 dBm and −5 dBm in 0.5 dB steps. Typically, a higher modulator output level produces a higher power out of the transmit RF power amplifier.

The quality of a terminal's uplink transmission is measured on multiple downlink receivers by using the raw link bit error rate (BER). It will be noted that every burst is encoded using a convolution forward error correction code (FEC). The FEC decoder in a terminal 200/400 provides an accurate estimate of the BER for a received burst before any error correction is performed. All terminals in the network periodically transmit a special burst referred to as a Control Burst (CB) which is primarily used to maintain terminal transmit synchronization. The CB is visible on the downlink to several terminals in the corresponding spot or beam, including a Reference Terminal (RT). Thus, for every transmitting terminal, a BER measurement indicating link quality is made at multiple downlink terminals.

Figure 3:
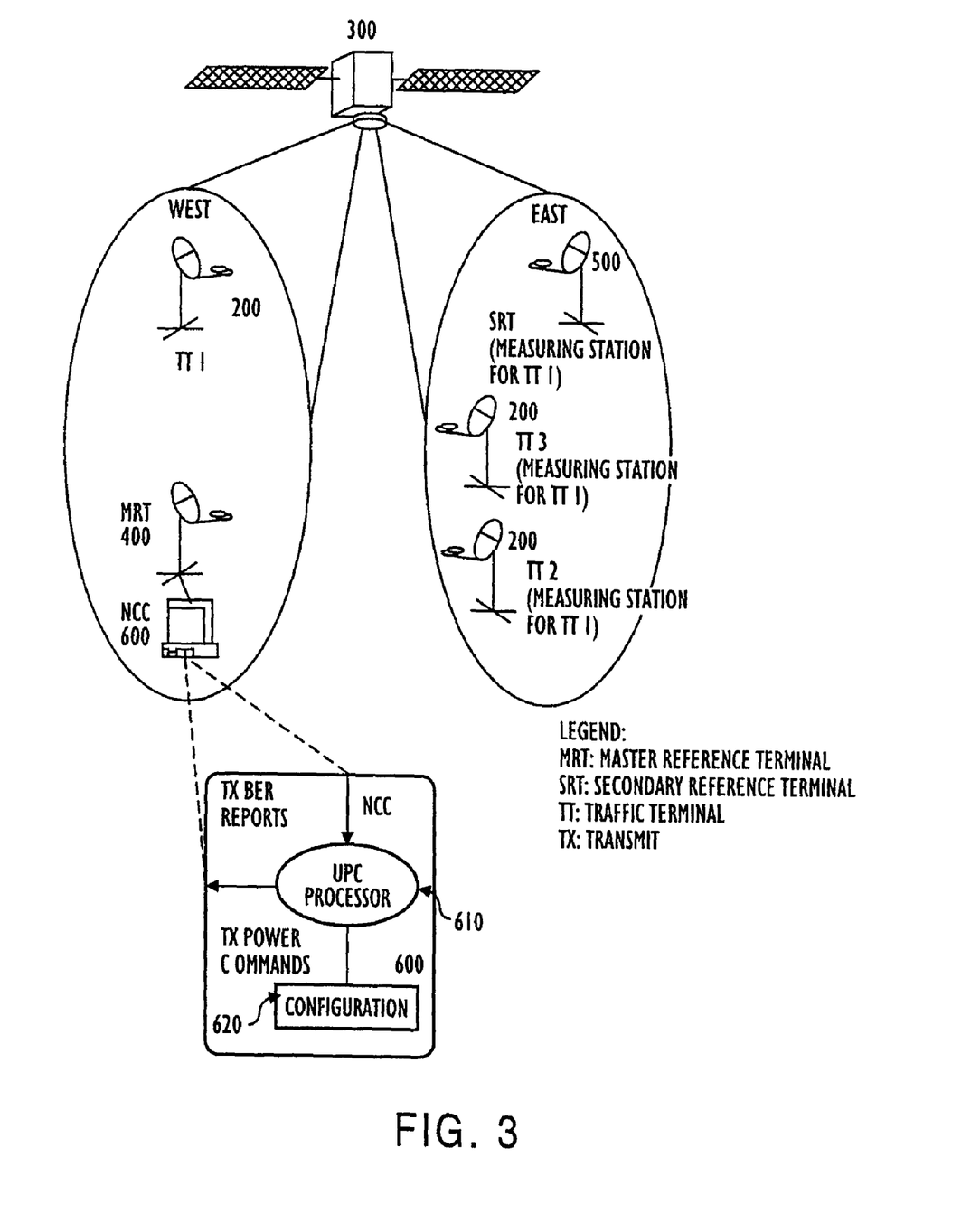
FIG. 3 illustrates shows a representative spot beam configuration that depicts three ad designated measuring stations (SRT, TT2, and TT3) for station TT1 employed in implementing the uplink power control method according to the present invention.

It should be mentioned at this point that the UPC method according to the present invention does not require that every terminal in the network perform measurements on every transmitter visible to them. The NCC 600 advantageously determines a set of measuring stations and commands selected terminals to perform measurements. FIG. 3 illustrates a representative spot beam configuration that depicts three designated measuring stations (SRT, TT2, and TT3) for station TT1. It should be mentioned that the use of multiple measuring stations works uniformly in global, hemispherical, and spot beam environments. The TDMA network architecture includes a timing and control scheme that works in all beam configurations. Thus, for every transmitter, multiple observers advantageously can be found.

Every measuring terminal computes BER on all bursts received by it, including a Reference Burst (RB) transmitted by the MRT 400 and the CB transmitted by different traffic terminals 200. The measuring terminal generates a downlink fade tag by examining the BER on all bursts received (including the RB) and determining if a majority of them, including the RB, are degraded. Every measuring terminal sends the CB BER measurement for each transmitting traffic terminal to the NCC 600 along with the tag indicating downlink fade. It is important to correctly attribute an overall change in link quality to either transmit impairments or downlink degradations. The NCC 600 uses the downlink fade tag to select CB BER measurements for further processing according to the UPC method.

The NCC 600 maintains a configuration database for every terminal. Items in this database include amplifier characteristics, location, rain zone information, link propagation data, reference power-BER characteristics, threshold values for BER, and threshold values for downlink impairment detection. Amplifier data includes the minimum IBO that meets output spectral specifications. It will be appreciated from FIG. 3 that NCC 600 advantageously includes a UPC controller 610 coupled to a memory 620 storing the configuration database.

The NCC 600 uses transmit power as the primary means to adjust link quality. Optionally, the modulation scheme (BPSK/QPSK) and burst FEC coding rate can be changed to extend the range of link quality improvement. More specifically, the NCC 600 performs the following method to dynamically detect transmit amplifier compression and derive a transmit power adjustment on a burst-by-burst basis for every terminal.

The method for dynamically determining the transmit compression point according to the present invention will now be described while referring to FIG. 4. It will be appreciated that the 1 dB compression of the amplifier, e.g., the amplifier in MRT 400, is referred to by P1, which is defined as the input power level at which the output power is 1 dB below the linear scale at 25° Celsius. In short, P1 is located just under the saturation level of the amplifier operating at standard conditions.

It will be appreciated that the terminal normally transmits all bursts, including the CB, at a power level set by the NCC 600. Periodically, e.g., once in 30 minutes although other periods are possible, the terminal transmits the CB calibration sequence at power levels H, M, and L for several frames. On the downlink, the BER for all received bursts is computed and for CB BER, the corresponding transmit power setting indicated in the CB data is extracted at the receive terminal. The CB BER is then reported to the NCC 600 with a transmit power indication and the downlink fade tag described previously.

Figure 4:
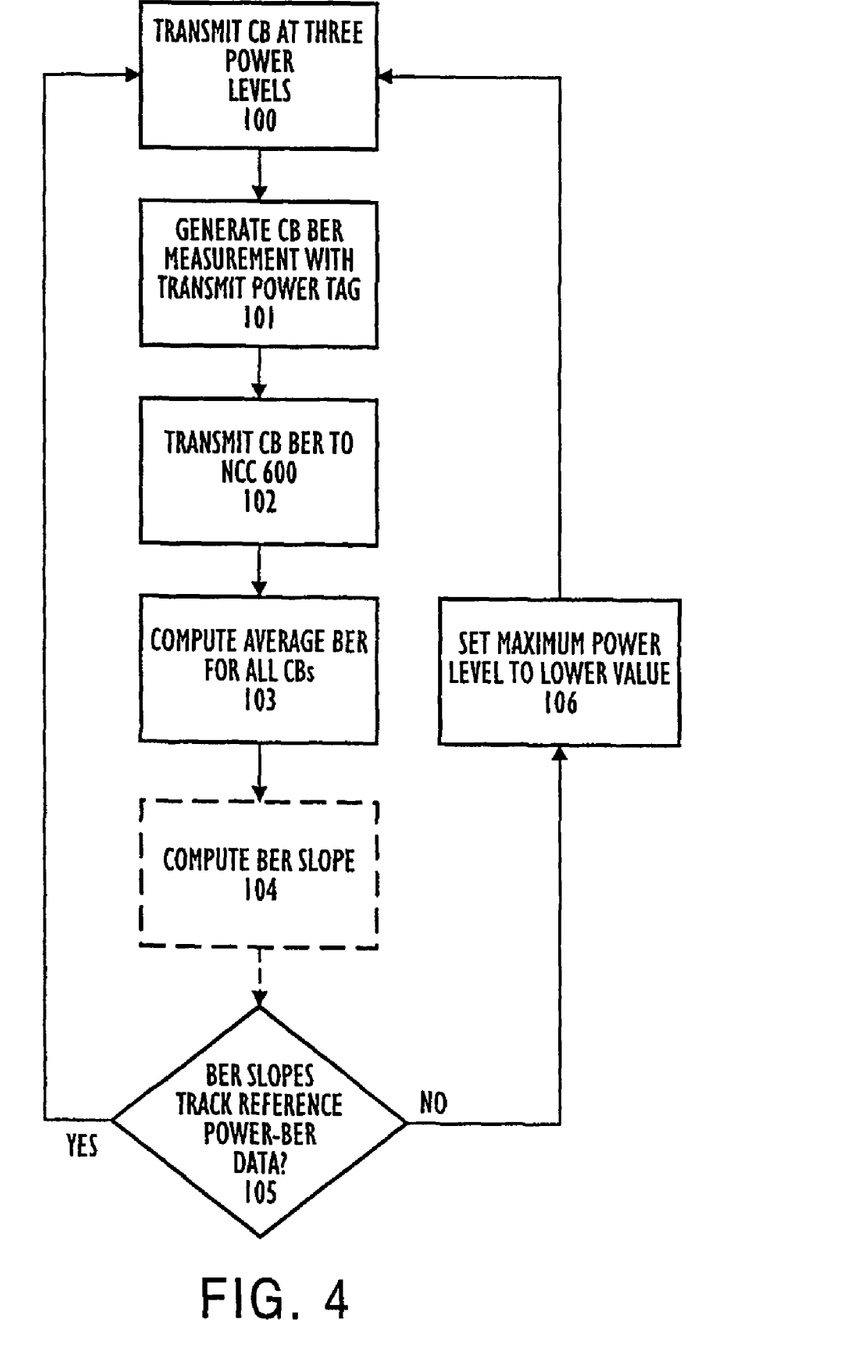
FIG. 4 is a flowchart illustrating the steps in a method for dynamically determining the transmit compression point according to the present invention.

As illustrated in FIG. 4, during Step 100, the terminal periodically implements the CB calibration sequence. In this sequence, the terminal transmits the CB at three different power levels: high power level H; medium power level M; and low power level L, frame to frame. It will be appreciated that the CB includes data on the transmit power used. Initially, H=P1−h dB, M=P1−m dB and L=P1−1 dB, where typical values for h, m, and l are 1, 2, and 3 dB, respectively. It will also be appreciated that these values are maintained in the NCC 600 configuration database.

During Step 101, each receiver tags the CB BER measurement with the transmit power indicated and transmit this information to NCC 600 during Step 102. The NCC 600 computes the average BER for all CBs from a terminal at H, M, and L power levels at Step 103. Then, the BER slope is computed for levels H to M, M to L, and H to L during Step 104.

During Step 105, a check is performed to determine whether the BER slopes track reference power-BER data. When the BER difference scales corresponding to the power difference, i.e., all BER slopes are tracking the reference power-BER data, the amplifier transmit characteristics are normal and not shifted. The method jumps back to Step 100. However, when the BER indicates less increase in performance with increased power, i.e., lower slope at higher power levels, the terminal is approaching saturation. In this latter case, the maximum power allowed, P, for the terminal is set at level M at Step 106. Normally, the maximum power level allowed is set at H. The method then jumps back to the start of Step 100.

Figure 5:
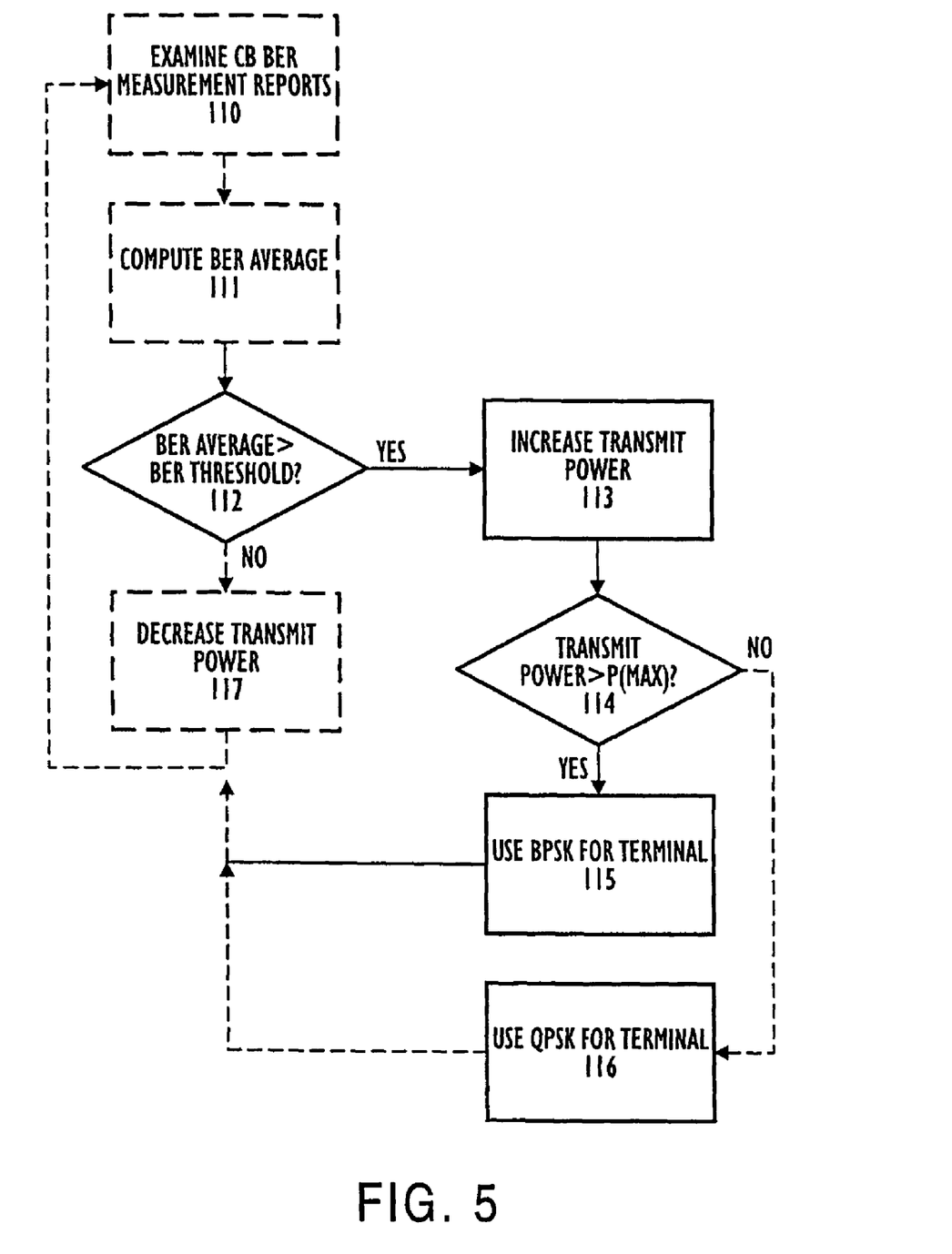
FIG. 5 is a flowchart illustrating the steps in the uplink power control method according to the present invention.

The UPC method according to the present invention is illustrated in FIG. 5. During Step 110, the NCC 600 examines CB BER measurement reports for each transmitting terminal 200, i.e., SRT, TT 2 and TT 3 as illustrated in FIG. 3, and computes the average of BER measurements from a sub-set of measuring terminals with unfaded downlinks during Step 111. This set is derived from the earth station configuration as an ordered set based on antenna size, starting with the smallest. It should be noted that terminals marked in the configuration database as located in a low rain zone region and with high stability downlink chain are preferred measurement terminals. Measurements from terminals with the smallest antenna size have the best sensitivity to uplink impairments, especially when the measuring terminal downlink is not degraded. It should also be noted that typical networks are uplink power limited. Terminals with large receive gain or antenna size are less representative of a majority of the terminals in the network and less susceptible to impairments in a power limited transmitter.

A check is then performed at Step 112 to determine whether the average BER is greater than a predetermined BER threshold. When the average BER is greater than threshold BER, transmit power is increased by U dB at Step 113; when the average BER is less than threshold BER, transmit power is decreased by D dB at step 117. Step sizes U and D are determined based on the difference between the measured BER and target BER and maintained in a data table in the NCC configuration database. It will be appreciated that this UPC method according to the present invention provides a fast response to uplink rain fade events and slow response to other time/temperature dependent degradations.

Furthermore, as mentioned previously, the TX power is limited to P, based on the compression point of the transmitter. A check is then performed at Step 114 to determine if transmit power is greater than maximum power level P. When the average BER is greater than the threshold BER even at maximum power level P, the terminal is marked as preferring BPSK modulation for the bursts during step 115. The method then returns to the beginning of Step 110. When the average BER is less than the threshold BER, the terminal is marked as preferring QPSK modulation for the bursts. The method then returns to the beginning of Step 110. Advantageously, the NCC 600 allocates bursts of the preferred modulation type subject to frame space availability and traffic priorities.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for dynamically determining the power compression point of an amplifier in a distributed network under the control of a computer, the network having a first terminal including the amplifier, the first terminal being operatively coupled to a plurality of second terminals by a communication channel, said method comprising:
    generating bit error rate (BER) messages indicative of a measured BER for a signal transmitted at each of N power levels, where N is a positive integer, each of said BER messages including data indicative of a power level, among the N power levels, corresponding to the measured BER in the each of said BER messages, at the second terminals; and
    reducing the maximum allowed power of the amplifier when it is determined that the amplifier is approaching saturation responsive to the generated BER messages, wherein the signal is always transmitted at the N power levels prior to the reducing the maximum allowed power of the amplifier.

2. The method as recited in claim 1, wherein N is an integer greater than 2, and wherein said reducing the maximum allowed power comprises:
    determining an average BER responsive to said generated BER messages;
    determining a BER slope responsive to said determined average BER; and
    reducing the maximum allowed power when the BER slope is indicative of a lower slope at higher power levels.

3. The method as recited in claim 1, wherein the signal is a control burst.

4. The method as recited in claim 3, wherein the control burst is transmitted at the N power levels in N sequential frames, and wherein N is an integer greater than or equal to 2.

5. A method for dynamically determining the power compression point of an amplifier in a distributed network under the control of a computer, the network having a first terminal including the amplifier, the terminal being operatively coupled to a plurality of second terminals by a communication channel, said method comprising:
(1) transmitting a signal at N power levels to the second terminals, where N is a positive integer;
(2) measuring a bit error rate (BER) for the signal at each of said N power levels at the second terminals;
(3) generating BER messages for the signal at each of said N power levels, each of said BER messages including the measured BER and data indicative of a power level, among said N power levels, corresponding to the measured BER in the each of said BER messages;
(4) transmitting the BER messages to the computer; and
(5) when it is determined that the amplifier is approaching saturation from the BER messages, reducing the maximum allowed power of the amplifier,
wherein the signal is always transmitted at the N power levels prior to the reducing the maximum allowed power of the amplifier.

6. The method as recited in claim 5, wherein the signal is a control burst, and wherein the communications channel comprises a satellite.

7. The method as recited in claim 6, wherein the control burst is transmitted at N power levels in N sequential frames, and wherein N is an integer greater than or equal to 2.

8. The method as recited in claim 5, wherein said reducing the maximum allowed power further comprises:
(5) (i) determining an average BER responsive to said generated BER messages;
(5) (ii) determining a BER slope responsive to said determined average BER; and
(5) (iii) reducing the maximum allowed power when the BER slope is indicative of a lower slope at higher power levels.

9. The method as recited in claim 5, wherein said reducing the maximum allowed power further comprises:
(5) (i) determining an average BER responsive to said generated BER messages;
(5) (ii) determining a BER slope responsive to said determined average BER; and
(5) (iii) evaluating the BER slope with respect to a reference power-BER data stored in the computer; and
(5) (iv) reducing the maximum allowed power when the determined BER slope and said reference power-BER data diverge to thereby indicate a lower slope at higher power levels.

10. The method as recited in claim 5, wherein the transmitting the signal at the N power levels further comprises:
transmitting a first plurality of signals at a high power level H;
transmitting a second plurality of signals at a medium power level M; and
transmitting a third plurality of signals at a low power level L.

11. The method as recited in claim 10, wherein H=P1−h (dB), M=P1−m (dB), and L=P1−l (dB),
wherein P1 is a 1 dB compression of the amplifier, h=1 dB, m=2 dB; and l=3 dB, and
wherein the maximum allowed power of the amplifier is H.

12. A method for dynamic uplink power control for an amplifier in a distributed network under the control of a computer, the network having a first terminal including the amplifier, the first terminal being operatively coupled to a plurality of second terminals by a communication channel, said method comprising:
examining a plurality of control burst bit error rate (CB BER) measurement reports, said reports respectively corresponding to a signal transmitted at each of N power levels, where N is a positive integer, each of said CB BER measurement reports including data indicative of a measured BER and data indicative of a power level, among the N power levels, to which each of said CB BER measurement reports corresponds;
computing an average CB BER responsive to said examined plurality of the CB BER measurement reports;
determining whether the amplifier is approaching saturation, wherein the determining comprises determining whether a power level of the amplifier is greater than a maximum allowed power level of the amplifier responsive to the examined CB BER measurement reports; and
reducing the maximum allowed power level of the amplifier when it is determined that the power level of the amplifier is greater than the maximum allowed power level,
wherein the signal is always transmitted at the N power levels prior to the reducing the maximum allowed power level of the amplifier.

13. The method as recited in claim 12, further comprising:
when the power level is greater than said maximum allowed power level, varying at least one characteristic of a signal carried by the communications channel so as to reduce the BER; when said computed average CB BER is greater than a predetermined BER threshold, increasing the power level of the amplifier; and when said computed average CB BER is less than said predetermined BER threshold, decreasing the power level of the amplifier.

14. The method as recited in claim 13, further comprising:
when the power level is greater than said maximum allowed power level, establishing binary phase shift keying (BPSK) as a signal modulation technique to modulate the signal transmitted at the N power levels; and
when the power level is less than said maximum allowed power level, establishing quadrature phase shift keying (QPSK) as the signal modulation technique to modulate the signal transmitted at the N power levels.

15. The method as recited in claim 14, wherein said determining step is performed following said increasing the power level of the amplifier.

16. A method for dynamic uplink power control for an amplifier in a distributed network under the control of a computer, the network having a first terminal including the amplifier, the first terminal being operatively coupled to a plurality of second terminals by a communication channel, said method comprising:
examining a plurality of control burst bit error rate (CB BER) measurement reports, said reports respectively corresponding to a signal transmitted at each of N power levels, where N is a positive integer, each of said CB BER measurement reports including data indicative of a measured BER and data indicative of a power level, among the N power levels, to which each of said CB BER measurement reports corresponds;
computing an average CB BER responsive to said examined plurality of the CB BER measurement reports;
determining whether the amplifier is approaching saturation, wherein the determining comprises determining whether a power level of the amplifier is greater than a maximum allowed power level of the amplifier responsive to the examined CB BER measurement reports; and
reducing the maximum allowed power level of the amplifier when it is determined that the power level of the amplifier is greater than the maximum allowed power level, wherein the signal is always transmitted at the N power levels prior to the reducing the maximum allowed power level of the amplifier.

17. The method as recited in claim 16, further comprising:
when it is determined that the power level is greater than said maximum allowed power level, varying at least one characteristic of a signal carried by the communications channel so as to reduce the BER;
comparing said computed average CB BER with a predetermined BER threshold;
when said computed average CB BER is greater than said predetermined BER threshold, increasing the power level of the amplifier; and
when said computed average CB BER is less than said predetermined BER threshold, decreasing the power level of the amplifier.

18. The method as recited in claim 17, further comprising:
when the power level is greater than said maximum allowed power level, establishing binary phase shift keying (BPSK) as a signal modulation technique to modulate the signal transmitted at the N power levels; and
when the power level is less than said maximum allowed power level, establishing quadrature phase shift keying (QPSK) as the signal modulation technique to modulate the signal transmitted at the N power levels.

19. The method as recited in claim 18, wherein said determining step is performed following said increasing the power level of the amplifier.

20. The method as recited in claim 17, further comprising:
determining up and down power values U and D, respectively, based on the computed average BER and a target BER; and wherein:
said increasing the power level comprises increasing power level of the amplifier by U dB;
said decreasing the power level comprises decreasing the power level of the amplifier by D dB; and
U and D are real numbers stored in a database of the computer.

* * * * *